FLOATING BACK DIODE LIMITER

Filed June 9, 1964 2 Sheets-Sheet 1

INVENTOR
Olav PETERSON

AGENTS

INVENTOR
Olav PETERSON

AGENTS

United States Patent Office 3,321,642

Patented May 23, 1967

3,321,642

FLOATING BACK DIODE LIMITER

Olav Peterson, Ottawa, Ontario, Canada, assignor to Northern Electric Company Limited, Montreal, Quebec, Canada Filed June 9, 1964, Ser. No. 373,673
7 Claims. (Cl. 307—88.5)

This invention relates to a circuit for amplitude limiting of an alternating signal.

It is sometimes required that the amplitude of an alternating or pulsating signal should be limited or maintained to a constant value. For instance, certain demodulators used in frequency modulation receivers are not entirely insensitive to the amplitude variations of the applied signal. These amplitude variations appear in the output of the receivers, resulting in undesired noise signals. Therefore, limiters are employed to maintain the signal applied to the demodulators free of amplitude variations. Limiters are also used in other equipment; for instance, to assure that the amplitude of a modulating signal does not exceed a certain value when applied to the carrier wave in a radio transmitter so that 100% modulation of the carrier wave is not exceeded, etc.

In these cases, it is ideally required that (a) the limiter be as fast-acting as possible so that no virtually instantaneous peaks of signal will exceed the desired limiting level; and so that high signal frequencies will be effectively limited; (b) the output versus input signal characteristic be linear to the limiting threshold point and then have zero slope so that the output signal will rise no higher in amplitude; and (c) there be no phase modulation of the input signal by the limiting device due to amplitude variations of the input signal.

Presently, it is well known to provide a limiting circuit comprising a pair of oppositely poled diodes with biasing means, connected across a signal path. An ideal diode is normally a device wherein there is no resistance to current flowing through it in the forward direction, while there is infinite resistance to current flowing through it in the reverse direction. Limiters using these ideal normal diodes require a bias potential between one conductor of the signal path and one end of the diode to make the voltage-current conduction characteristic of the diode shift and thus cause the limiting threshold point to be at the bias voltage.

In practice, this ideal is never perfectly achieved. For instance, a germanium diode requires a potential of approximately .25 volt impressed across it in the forward conduction direction before virtually any current flows. The voltage-current conduction characteristic is definitely non-linear. This non-linear forward conduction characteristic also shows that the current flowing in the forward direction encounters non-linear resistance. In addition, a high potential applied across the germanium diode in the reverse conduction direction causes the diode to break down.

The diodes, when connected as described above, therefore conduct in their forward directions once the biasing potentials plus the threshold voltages of the diodes are overcome by the amplitude of the input signal. Ideally, in the absence of forward resistance, no further voltage increase would be measured across the limiter should the input signal increase higher in amplitude. In practice, because of the finite resistance of the forward conduction modes of the diodes, small increases in amplitude do in fact occur.

In these well known limiting circuits it is sometimes desired that the diodes not be connected across the signal path in such manner that direct currents can pass through them. In these cases, it is common to provide the bias source with a high internal impedance, and to place a capacitor in parallel with each bias source so that alternating currents alone will traverse through the diodes and through the capacitors from the signal path.

It has been found that when amplitude modulation exists on a frequency modulated signal, amplitude to phase modulation conversion occurs in a voltage dependent reactance, such as semiconductor P-N junction, which is the essence of normal diode as used in conventional limiter circuits. This can give rise to undesired output signals, since phase and frequency modulation is indistinguishable in a frequency demodulator.

I have invented a signal amplitude limiter which does not require an external bias source, as an extremely fast operating time, achieves a great improvement in reduced internal resistance of the limiter once the limiting threshold point has been exceeded, and introduces negligible amplitude to phase modulation conversion.

My signal amplitude limiter comprises a signal input circuit and a signal output circuit, a signal path connecting the output to the input circuit, and a first circuit means comprising a back diode and charge storage means connected in series across the signal path, said limiter circuit being arranged such that an input signal from the signal input circuit exceeding a predetermined amplitude cooperates with the back diode and said storage means to bias the back diode in the reverse condution direction.

In this specification, the forward conduction direction is meant to be the direction wherein the current majority carries use the quantum mechanical tunneling phenomenon as the predominant mode of traversing the diode junction. This normally occurs at a lower absolute voltage than the reverse conduction voltage. Biasing of the back diode will occur just as well, however, should the reverse conduction absolute voltage be of smaller magnitude than the forward conduction absolute voltage. However, this disclosure will only discuss in detail the case wherein the forward conduction voltage is smaller than the reverse conduction voltage since the mode of operation of the aforementioned case will become readily apparent.

The basic mode of operation of my limiter circuit depends upon the fact that the forward and reverse conduction voltages of the back diode are not equal in absolute value. Therefore, as will become apparent in the detailed description of my invention, since an input signal to my limiter circuit, for example a carrier wave, has substantially equal lengths of time during the positive and negative half-cycle voltage swings, the diode does not conduct in each direction for equal lengths of time. Biasing means in my limiter circuit comprises a capacitor in series with the back diode which is charged by the current flowing through the back diode. Since the time that current flows through the back diode in one direction is not equal to the length of time that the current flows through the back diode in the other direction due to the unequal forward and reverse conduction voltages, the capacitor (which will be charged, say by current flowing through the diode in the forward conduction direction) will be unable to discharge completely during the reverse direction time of conduction of the back diode.

Therefore, it may be seen that the capacitor will retain a net charge thereon, biasing the diode in the reverse conduction direction. It may also be seen that since the time constants of the charging and discharging circuits, comprising the signal input circuit, for and including the capacitor are equal, the capacitor will charge to a value which will bias the diode such that the time during which the diode will conduct in its forward direction will be equal to the time that the diode will conduct in the reverse direction. At this point, the charge and discharge times for the capacitor will be equal and thus the average charge on the capacitor will not change. It may be seen, therefore, that the forward and reverse conduction characteristics of the diode are shifted so that the threshold of limiting for both the positive and negative-polarity portions of the input signal are at equal voltage magnitudes.

A description of a back diode may be found in Philco Application Laboratory Report #750 "Tunnel Diode and Backward Diode Guide for Circuit Designers" by N. P. Gable and P. Spiegel, pages 9–10, or in R.C.A. "Tunnel Diodes for Switching and Microwave Applications," Technical Manual TD-30, page 14. As described therein, a back diode is essentially a tunnel diode, but having a doping level not so high as to be degenerate in the N and P regions of the junction, as a tunnel diode is. It has a somewhat non-linear forward conduction characteristic, although usually not as non-linear as an ordinary diode, and has substantially less reverse resistance than an ordinary diode. The reverse conduction characteristic is also usually more linear than the forward conduction characteristic at higher reverse conduction voltages than the reverse threshold point.

It will be realized that because the diode has finite and unequal resistances in the forward and reverse direction, the positive and negative portions of the input signal will be unequally and imperfectly limited. The second and preferred embodiment of my invention therefore provides two diode-capacitor circuits in parallel, so that one circuit will conduct in its forward direction while the other circuit conducts in its reverse direction. The charges on the capacitors are such during operation, that a composite characteristic of the circuit is achieved wherein the forward conduction characteristic of one circuit is added to the reverse conduction characteristic of the other circuit to produce a composite characteristic having negligible resistance at higher signal input levels than both the positive and negative limiting threshold points.

Because the back diode conducts by majority carrier tunneling in the forward direction, a great improvement in operating speed is afforded over the usual diode operating mode of minority carrier injection across the diode junction. Also, a back diode is relatively independent of temperature in the forward conduction direction. Because of the small storage capacitance of the back diode junction, there is negligible phase modulation conversion of amplitude modulation effects.

The invention may be better understood by referring to the drawings listed below:

Figure 1:
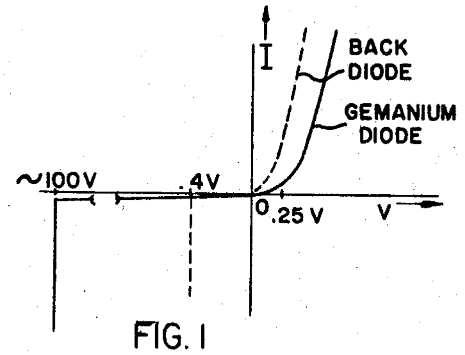
FIG. 1 shows the relationship between the conduction characteristics of an ordinary germanium diode and a back diode.

FIG. 1 is a graph comparing the conduction characteristics of an ordinary germanium diode and a back diode. The abscissa is the applied voltage (V) axis and the ordinate is the diode conduction current (I) axis. As may be seen, the conduction curve of the germanium diode is sloping and curvacious in the upper right quadrant of the graph. This shows a finite and non-linear resistance. The back diode curve shows less resistance and more linearity. The reverse conduction characteristic in the lower left-hand quadrant of the graph shows that of the order of 100 volts must be applied across the germanium diode before conduction occurs. At this point, the germanium diode conducts heavily, and usually excessive current flows causing the junction to melt. The reverse characteristic, however, is nearly linear, and shows little resistance. The back diode shows a similar reverse conduction characteristic but at a much smaller reverse potential.

The back diode is specifically constructed not to melt under reasonable currents in the reverse direction. It is formed so that the reverse conduction voltage is in the same order of magnitude as the forward conduction voltage. Consequently, a typical back diode has a forward conduction voltage of approximately .15 volt and a reverse conduction voltage of approximately .4 volt.

Figure 2:
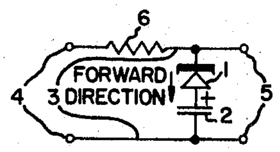
FIG. 2 shows the simplest form of my invention.

FIG. 2 shows the simplest form of my invention, comprising a back diode 1 in series with a capacitor 2 connected across a signal path 3. It may be seen that the forward direction of the back diode symbolically is shown in the direction normally considered to be the reverse conduction direction of a normal diode. A signal which is to be limited is applied via the signal input circuit comprising, in this embodiment but not necessarily limited to, input terminals 4 and resistor 5. The limited signal may be sensed at the output circuit comprising, in this case, output terminals 5.

Figure 3:
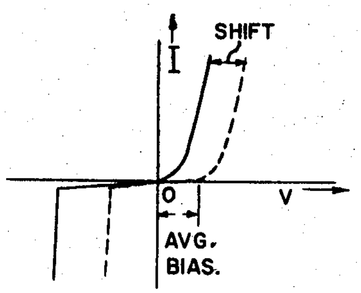
FIG. 3 shows how the characteristics of a back diode are shifted by the action of the biasing means.
Figure 4:
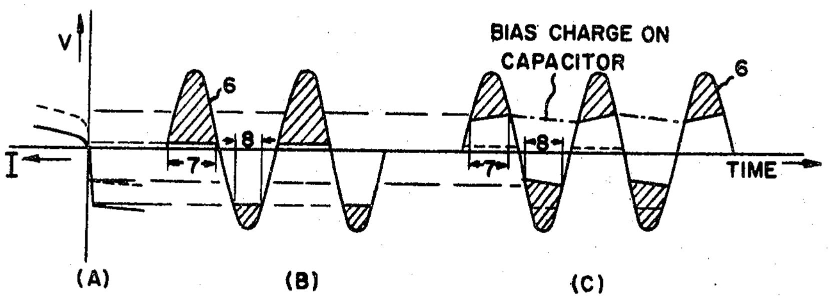
FIG. 4 shows two wave forms; the first a composite of the input and limited voltages using simply a back diode connected directly across a signal path, the second being a composite of the input voltage, limited voltage, and charge on the capacitor which is placed in series with a back diode connected across a signal path in accordance with my invention.

The operation of the circuit will be explained by the use of the diode conduction characteristics of FIG. 3 and the wave forms shown in FIG. 4. Considering the solidly drawn portion of FIG. 3, we first recognize the conduction characteristics of the back diode drawn on a set of I (conduction current) —V (applied voltage) axes. Assuming for a moment that the capacitor 2 of FIG. 2 is deleted and a short circuit inserted in its place, a signal applied at terminals 4 of FIG. 2 will be limited in a well known manner and may be sensed at terminals 5. The input signal may appear similar to the complete sinusoidal wave 6 shown in FIG. 4*b*. Due to the unequal forward and reverse conduction voltages as shown by the solid curve in FIG. 3, the shaded portion of the sinusoidal wave 6 will be conducted through the back diode and the wave form at terminals 5 will appear similar to the unshaded remaining portion of the sinusoidal wave 6 shown in FIG. 4*b*.

It may be seen that the forward conduction time 7 and reverse conduction time 8 of the diode are unequal due to the unequal forward and reverse conduction voltages of the back diode. For ease in visualizing this, the I–V axes are reproduced in FIG. 4*a* and the conduction characteristic of the back diode in this case is also shown as the solidly drawn line.

Consider now the case where capacitor 2 is in series with back diode 1, as shown in FIG. 2. In this case, a signal applied via the input circuit 4 and 5 will cause the diode to conduct once its forward conduction voltage has been exceeded. Thus, capacitor 2 will be caused to charge during that interval. As the input signal voltage swings to its opposite direction, the back diode will begin conducting in the reverse direction once the input signal voltage minus the net charge on the capacitor exceeds the reverse conduction voltage of the back diode. Since the reverse conduction voltage of the back diode is exceeded during a shorter period of time than the forward conduction voltage of the diode, a net charge remains on capacitor 2 in the direction shown by the + in FIG. 2. It may be seen that through successive cycles the net charge on the capacitor will tend to reach a stable value depending on the forward and reverse conduction voltages of the back diode and the time constant of the charge and discharge path of the capacitor. Thus, the effect of this net charge is to bias the back diode in the reverse conduction direction so that the forward and reverse conduction voltages of the diode and capacitor combination are substantially equal in magnitude. The effect on the conduction characteristics of the diode is shown in FIG. 3 as the shift in the conduction characteristcs, as shown by the dashed curve. The amount of the shift is shown as the average charge on the capacitor. This shift is reproduced in FIG. 4*a* and the resultant input and output sigal wave forms are shown in FIG. 4*c*. The input signal 6 is shown clipped by the shaded portions so that the output signal is that corresponding to the unshaded portion of the input signal. It may be seen that the forward conduction voltage of the back diode—capacitor combination is biased by the average charge on the capacitor so that the forward conduction time 7 is substantially equal to the reverse conduction time 8 of the circuit. In this figure, the increase and decrease of the biasing charge on the capacitor is exaggerated for clarity. It may therefore be seen how an input signal can be limited by the use of my invention and how my limiter does not require the use of an auxiliary bias supply.

Figures 5, 6:
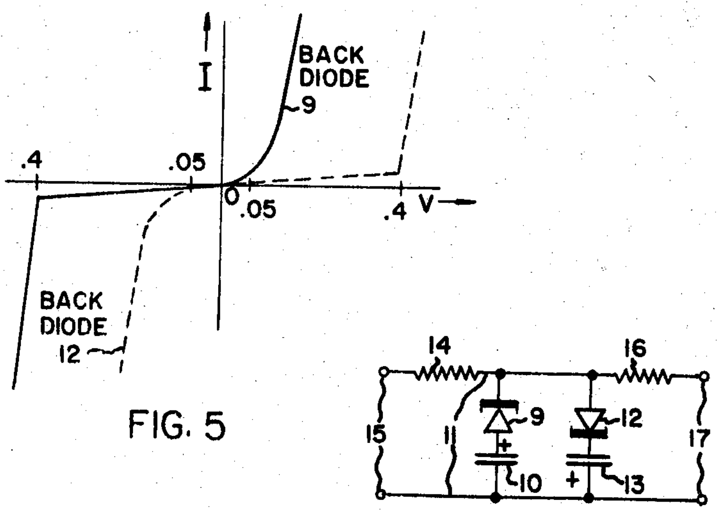
FIG. 5 shows the relationship between two back diodes, oppositely poled, connected in parallel across the signal path.
FIG. 6 shows a schematic drawing of one way to effect the preferred embodiment of my invention.

FIG. 5 shows the characteristics of two oppositely poled back diodes connected in parallel across a signal path. As may be understood, when a signal is applied to the signal path in this case, each diode conducts in its forward direction as soon as its forward conduction voltage is reached. The forward conduction resistance introduces rather inefficient limiting, although the circuit would limit better than prior art liimters due to the back diodes' decreased forward resistance from ordinary diodes.

Figure 7:
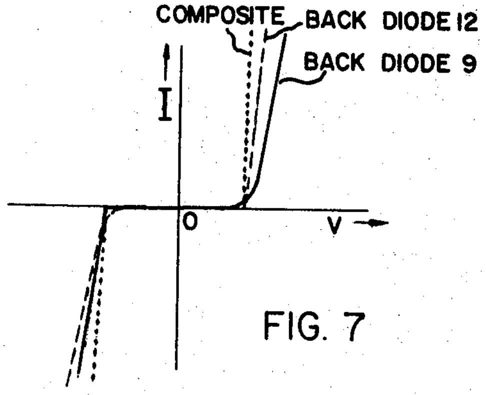
FIG. 7 shows a composite characteristic of the limiter when constructed in accordance with the principles of the preferred embodiment of my invention.

My second and preferred embodiment has a capacitor in series with each of the diodes mentioned in the paragraph above as shown in FIG. 6, so that each of the diodes may be biased in such manner that the forward and reverse conduction threshold voltages of each of the diode and capacitor combinations are substantially equal in magnitude. The composite characteristics are shown in FIG. 7. Each diode and capacitor combination operates in essentially the same manner as described in the embodiment above. However, because of the opposite polarities, one back diode will conduct in its forward direction while the other back diode will conduct in its reverse direction.

FIG. 6 shows back diode 9 in series with capacitor 10 connected across the signal path 11, and back diode 12 connected with opposite polarity to back diode 9, in series with capacitor 13 connected across signal path 11. An input circuit comprising resistor 14 and input terminals 15 is provided as well as an output circuit comprising resistor 16 and output terminals 17. Although the aforementioned input and output circuits are mentioned herein, the invention is not limited thereto.

In operation, and considering FIGURES 5, 6, ad 7 together, it may be seen that the conduction characteristics of back diode 9 and 12 represented by the solid and dashed curves are shifted by the biasing charges on their respective series capacitors in their separate reverse conduction directions. In this way, the individual characteristics shown in FIG. 5 form the composite characteristic shown by the dotted curve of FIG. 7. As may be seen, the forward resistance of back diode 9 and the reverse resistance of back diode 12 combine to form a composite resistance in the positive signal direction substantially less than either resistance taken individually. A similar result occurs from the combination of the reverse resistance of back diode 9 and the forward resistance of back diode 12. In this manner, as may be seen by regarding the dotted composite conduction characteristic, a highly linear conduction characteristic having extremely small and essentially linear forward and reverse resistance is produced. Furthermore, due to the tunneling mode of operation of at least one of the diodes during the positive and negative input voltage swings, negligible amplitude to phase modulation occurs.

In the experimental model of this embodiment, capacitors 10 and 13 were each .001 microfarad, resistor 14 was 18 ohms, and resistor 16 was 51 ohms.

It may be understood that a decrease in the time constant of the charge and discharge circuit of the capacitor, effected for instance by making the capacitor small, will cause the instantaneous charge thereon to more closely follow the input signal. Therefore, there will be large increases and decreases of bias charge within one cycle which will result in poor limiting. This is shown as the exaggerated bias charge in FIG. 4*c*. On the other hand, increasing the time constant of the charge and discharge circuit of the capacitor, effected for instance by making the capacitor extraordinarily large, will cause the capacitor to charge and discharge during an extra-ordinarily large period of time, and large-amplitude short-interval changes of the input signal will cause an unsymmetrical output signal during the capacitor discharge time.

My invention has operated well in a wideband amplifier at a frequency of approximately 70 megacycles. For instance, where a 70 megacycle signal, modulated to 30% by a 20 kilocycle signal was limited by my invention, a 39 db. compression of amplitude modulation resulted. Amplitude to phase modulation conversion was approximately .04 degree per db. of carrier amplitude variation. No significant change in this figure was observed during an ambient temperature change from 25° C. to 65° C., and output power diminished by only .2 db. with the temperature change; the major decrease being attributed to the apparatus associated with the limiter. Amplitude variation versus frequency change for the limiter was measured as being less than .05 db. over a 20 megacycle bandwidth having 70 megacycles as its center frequency. As may be appreciated, these figures show a significant advance over the prior state of the art.

Figure 8:
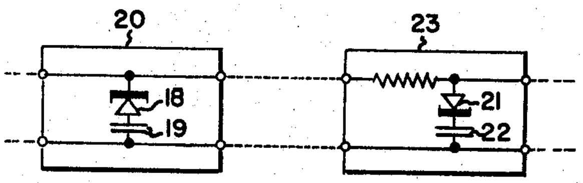
FIG. 8 shows another embodiment of my invention.

Another embodiment of my invention can be formed in the case where the signal is to traverse a transmission system having more than one stage as shown in FIG. 8. Back diode 18 and capacitor 19 can be used to limit in a first stage 20, and back diode 21 and capacitor 22 can be used to limit in a following stage 23. In this case, it is preferred to pole back diode 21 so that its reverse conduction direction is used to limit the portion of the signal which was previously limited by the forward conduction direction of back diode 18. It may be seen that if only one limiting circuit were provided in the transmission system, the non-equal forward and reverse resistances of the back diode will cause a slight unsymmetrical clipping action. If, in the embodiment of FIG. 8, additional amplification is introduced between the output of stage 20 and the input of stage 23, this slight unsymmetry will be amplified and the limiting effected by back diode 21 will be unable to compensate completely therefor. In this case, a higher second harmonic content in the final output signal than the preferred embodiment will result.

It may be seen, therefore, that I have provided a new limiter which can operate effectively to high frequencies without encountering problems previously met. I have eliminated the previously required bias supply and, with the experimental results described in my preferred embodiment, have provided a greatly improved limiter over the prior state of the art.

What is claimed is:

1. A signal amplitude limiter circuit comprising a signal input circuit and a signal output circuit, a signal path connecting the output to the input circuit, and a first circuit means comprising a back diode and charge storage means connected in series across the signal path, said charge storage means being of such capacity that in input signal from the signal input circuit exceeding a predetermined amplitude cooperates with the back diode and said storage means to charge said storage means to bias the back diode in the reverse conduction direction.

2. A signal amplitude limiter as defined in claim 1 wherein the forward and reverse threshold conduction voltages of said first circuit means are rendered substantially equal in magnitude.

3. A signal amplitude limiter as defined in claim 1 including second circuit means substantially identical to the first circuit means connected across the signal path in parallel with the first circuit means; the back diode in the second circuit means being poled such that the second circuit means will conduct in its reverse direction during at least a portion of the interval of time that the first circuit means is conducting in its forward direction.

4. For use in a signal transmission system having a signal path traversing a first stage and a following stage, a signal amplitude limiter as defined in claim 1 wherein the first circuit means is connected across the signal path at the first stage, and a second circuit means substantially identical to the first circuit means is connected across the signal path at the following stage in such manner that the second circuit means will conduct in its reverse direction during at least a portion of the interval of time that the first circuit means is conducting in its forward direction.

5. A signal amplitude limiter comprising a pair of input terminals and a pair of output terminals, one of the input terminals being directly connected to one of the output terminals, a signal input circuit comprising a resistor connecting the other input terminal to the other output terminals, and a back diode serially connected with a capacitor between the two output terminals, the capacity of the capacitor being predetermined so as to store charge therein in order to bias the back diode; the quantity of charge stored within the capacitor being determined by the input signal from the signal input circuit, the forward and reverse conduction voltages of the back diode, and the time constant of the signal input circuit including the capacitance of the capacitor.

6. A signal amplitude limiter comprising a pair of input terminals and a pair of output terminals, one of the input terminals being directly connected to one of the output terminals, a resistor connecting the other input terminal to the other ouput terminal, a first back diode serially connected with a first capacitor of predetermined value between the two output terminals, a second back diode poled oppositely to the first back diode serially connected with the second capacitor of predetermined value between the two output terminals, charge on the first capacitor serving to bias the first diode in its reverse conduction direction, charge on the second capacitor serving to bias the second back diode in its reverse conduction direction, the charge on each capacitor being determined by the input signal from said signal input circuit, the forward and reverse conduction voltages of the back diodes, and the time constants of the signal input circuit including the capacitances of the respective capacitors associated with each back diode; the second capacitor and diode combination conducting in its forward direction during at least a portion of the interval of time that the first capacitor and back diode combination is conducting in its reverse direction.

7. A signal amplitude limiter as defined in claim 1 wherein the charge storage means in the first cricuit means and the second circuit means are capacitors.

References Cited by the Examiner

UNITED STATES PATENTS

| | | | |
|---|---|---|---|
| 3,064,143 | 11/1962 | Sanderson | 307—88.5 |
| 3,188,554 | 6/1965 | Reid | 307—88.5 X |
| 3,196,289 | 7/1965 | Heizer | 307—88.5 |
| 3,234,403 | 2/1966 | Candy | 307—88.5 |

OTHER REFERENCES

Tale of the Hoffman Uni-Tunnel Diode—Or How Low Can You Get? by Hoffman Electronics Corp., December 1960, pp. 5 and 41 relied on.

ARTHUR GAUSS, *Primary Examiner.*

J. JORDAN, *Assistant Examiner.*